US007428228B2

(12) United States Patent
Jeong et al.

(10) Patent No.: US 7,428,228 B2
(45) Date of Patent: Sep. 23, 2008

(54) METHOD AND APPARATUS FOR DETECTING ACTIVE DOWNLINK CHANNELIZATION CODES IN A TD-CDMA MOBILE COMMUNICATION SYSTEM

(75) Inventors: Kwang-Yung Jeong, Yongin-si (KR); Jin-Weon Chang, Suwon-si (KR); Hyeon-Woo Lee, Suwon-si (KR); Een-Kee Hong, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 594 days.

(21) Appl. No.: 10/885,983

(22) Filed: Jul. 7, 2004

(65) Prior Publication Data
US 2005/0058103 A1    Mar. 17, 2005

(30) Foreign Application Priority Data
Jul. 7, 2003    (KR) ............... 10-2003-0045695

(51) Int. Cl.
    *H04B 7/216* (2006.01)
(52) U.S. Cl. .............. 370/335; 455/450; 455/452.1; 455/452.2; 455/509; 455/513; 455/553; 455/67.11; 370/342; 370/441; 370/329; 370/479; 375/343; 375/213; 375/340; 375/220
(58) Field of Classification Search ........ 455/450, 455/452.1, 452.2, 509, 513, 553, 67.11; 370/335, 370/342, 441, 329, 479; 375/343, 213, 340, 375/220
See application file for complete search history.

(56) References Cited

U.S. PATENT DOCUMENTS

| 5,353,332 | A | * | 10/1994 | Raith et al. ............... 455/455 |
| 2002/0097698 | A1 | | 7/2002 | Zeira et al. |
| 2002/0110099 | A1 | * | 8/2002 | Zeira et al. ............... 370/329 |
| 2003/0032441 | A1 | * | 2/2003 | Ofuji et al. ............... 455/525 |
| 2003/0223398 | A1 | * | 12/2003 | Haim et al. ............... 370/342 |
| 2005/0169216 | A1 | * | 8/2005 | Zeira et al. ............... 370/335 |

FOREIGN PATENT DOCUMENTS

CN    1352838    6/2002

* cited by examiner

*Primary Examiner*—Charles N Appiah
*Assistant Examiner*—Kwasi Karikari
(74) *Attorney, Agent, or Firm*—The Farrell Law Firm, PC

(57) ABSTRACT

A method and apparatus in a UE for detecting active channelization codes including channelization codes used by other UEs, which are different from at least one channelization code assigned to the UE, for transmission/reception to/from a Node B in an assigned time slot in a mobile communication system, where each of time slots of a radio channel frame is identified by a plurality of code channels, each having a unique channelization code. Accordingly, a channelization code set is formed to include a predetermined number of channelization codes to be searched, code channel data corresponding to the channelization codes is detected from a received signal, the code power of the code channel data is measured and compared with a predetermined threshold, and channelization codes having code power values exceeding the threshold are selected as active channelization codes.

16 Claims, 5 Drawing Sheets

METHOD AND APPARATUS FOR DETECTING ACTIVE DOWNLINK CHANNELIZATION CODES IN A TD-CDMA MOBILE COMMUNICATION SYSTEM

PRIORITY

This application claims priority under 35 U.S.C. § 119 to an application entitled "Method and Apparatus for Detecting Active Channelization Codes of Downlink in a TD-CDMA Mobile Communication System" filed in the Korean Intellectual Property Office on Jul. 7, 2003 and assigned Ser. No. 2003-45695, the contents of which are incorporated herein by reference.

BACKGROUND OF THE INVENTION

1. Field of the Invention

The present invention relates generally to a TD-CDMA (Time Division-Code Division Multiple Access) mobile communication system, and in particular, to an apparatus and method for enabling a user equipment (UE) to detect downlink channelization codes assigned to other UEs.

2. Description of the Related Art

Recent developments in the communications industry have broadened the range of services available in mobile communication systems from voice service to multimedia communication service in which a large volume of data such as packet data or multimedia data is transmitted. More specifically, downlink traffic is increasing relative to uplink traffic. Also, TDD (Time Division Duplex) is a more efficient scheme than FDD (Frequency Division Duplex) in supporting a multimedia communication system. The TDD identifies the uplink and the downlink by time slots, whereas the FDD identifies them by frequencies.

A common FDD system is IS-95A/B, which is based on CDMA, and a common TDD system is GSM (Global System for Mobile communication), which is based on TDMA (Time Division Multiple Access). Efforts have been made worldwide to develop $3_{rd}$ generation (3G) communication systems from the $2^{nd}$ generation (2G) communication systems. As a result, WCDMA (Wideband CDMA) and cdma2000 have been adopted as international FDD standards, while TD-CDMA has been adopted as an international TDD standard. TD-CDMA is an expansion of the existing TDD scheme, in which a plurality of code channels is assigned to a time slot.

There are two TD-CDMA systems: an HCR-TDD (High Chip Rate-TDD) that supports a 3.84-Mcps chip rate and an LCR-TDD (Low Chip Rate-TDD) that supports a 1.28-Mcps chip rate. A TD-CDMA system uses up to 16 channelization codes in each time slot. If a spreading gain of one time slot is 16, up to 16 code channels are used in the time slot.

For coherent reception, the TD-CDMA system uses a midamble sequence (or a training sequence), which is similar in function to the pilot channel of the CDMA system. A TD-CDMA receiver estimates a channel characteristic (impulse response) using the midamble sequence inserted in data. Based on the channel characteristic, the TD-CDMA receiver simultaneously eliminates through a joint detector (JD) multipath-incurred intersymbol interference (ISI) and multiple access interference (MAI) caused by communication accesses from multiple users.

A basic joint detection algorithm for the uplink will first be described herein below. Each of K UEs uses one channelization code and the spreading gain of the channelization code of a $k^{th}$ UE is Q. The channelization code of the $k^{th}$ UE having the spreading gain Q is denoted by $c^{(k)}$ and the impulse response of an uplink radio channel from the $k^{th}$ UE to a Node B is denoted by $h^{(k)}$. If the radio channel has a time delay of (W-1) chips, its impulse response is expressed as $h^{(k)}=[h_1^{(k)}, h_2^{(k)} \ldots h_w^{(k)}]^T$, where T denotes transpose.

For N data symbols $d^{(k)}=[d_1^{(k)}, d_2^{(k)} \ldots d_N^{(k)}]^T$ transmitted from the UE by its channelization code, the Node B receives a signal $e=[e_1, e_2, \ldots, e_{N \cdot Q+W-1}]^T$ that can be expressed as e=Ad+n. Then, the N data symbols can be expressed as a column vector $b=[d^{(1)^T}, d^{(k)^T} \ldots d^{(k)^T}]^T$. Here, n is an AWGN (Additive White Gaussian Noise) vector of length NQ+W-1 and the elements of A are a combination of the channelization code $c^{(k)}$ and the impulse response $h^{(k)}$.

ZF-BLE (Zero Forcing-Block Linear Equalizer) is a common joint detection algorithm. The ZF-BLE algorithm estimates data by multiplying both sides of e=Ad+n by $(A^H A)^{-1} A^H$. That is, $\hat{d}=(A^H A)^{-1} A^H e=(A^H A)^{-1} A^H (Ad+n) = d+(A^H A)^{-1} A^H n$ is taken as a symbol estimate. Superscript H denotes complex transpose. By excluding an AWGN-caused estimation error using the ZF-BLE algorithm, both MAI and ISI are eliminated at the same time.

The above joint detection offers excellent performance compared to an existing rake receiver, albeit its complexity. This advantage renders the joint detection almost essential to TD-CDMA systems using small spreading factors. In regard to the joint detection, therefore, extended algorithms to multiple antenna systems, MIMO (Multiple Input Multiple Output) systems, and smart antenna systems as well as many algorithms for reducing complexity with respect to performance have been proposed successively.

Implementation of the joint detection requires that a UE know channelization codes used for other UEs to eliminate MAI caused by the channelization codes. On the uplink, the Node B controls radio resources within its cell area and thus accurately knows channelization codes assigned to UEs within the cell area, which eliminates the need for exchanging additional channelization code information to eliminate ISI and MAI by joint detection. That is, because the Node B already has knowledge of the channelization codes (hereinafter, referred to as active channelization codes) assigned to the UEs within its cell area, it can accurately recover uplink data from them.

On the downlink, however, a UE has no knowledge of channelization codes assigned to other UEs. Therefore, the Node B notifies the UEs within its cell area of the active channelization codes, or each UE acquires information about the channelization codes on its own in order to eliminate MAI by joint detection. Active channelization codes are defined as a set of channelization codes in use for UEs within a predetermined cell area.

Traditionally, it was discussed that if a change occurs in an assignment of radio resources, the Node B notifies all active UEs within its cell area of changed active channelization codes. The radio resource assignment is changed when a handover between the Node B and a neighbor Node B, an internal handover within the Node B, a new call setup, or discontinuation of an ongoing call occurs. However, transmission of information relating to the changed active channelization codes to all the active UEs by signaling each time a change occurs in the radio resource assignment increases signaling load. As a result, there is a pressing need for a method that enables a UE to acquire active channelization code information without additional signaling.

SUMMARY OF THE INVENTION

Therefore, the present invention has been designed to substantially solve at least the above problems and/or disadvantages and to provide at least the advantages below. Accordingly, an object of the present invention is to provide an apparatus and method that enable a UE to acquire active channelization code information without a Node B transmitting the active channelization code information at each change in radio resource assignment in a TD-CDMA mobile communication system.

Another object of the present invention is to provide an apparatus and method that enable a UE to eliminate ISI and MAI using active channelization code information.

A further object of the present invention is to provide an apparatus and method for reducing a complexity of a UE involved in acquiring active channelization code information.

The above and other objects are achieved by providing a method and apparatus in a UE for detecting active channelization codes including channelization codes used by other UEs, different from at least one channelization code assigned to the UE, for transmission/reception to/from a Node B in an assigned time slot in a mobile communication system where each time slot of a radio channel frame is identified by a plurality of code channels each having a unique channelization code. In the method, a channelization code set is formed to include a predetermined number of channelization codes to be searched, code channel data corresponding to the channelization codes are detected from a received signal, the code power of the code channel data is measured and compared with a predetermined threshold, and channelization codes having code power values exceeding the threshold are selected as active channelization codes.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described in detail herein below with reference to the accompanying drawings. In the following description, well-known functions or constructions are not described in detail because they would obscure the invention in unnecessary detail.

Figure 1:
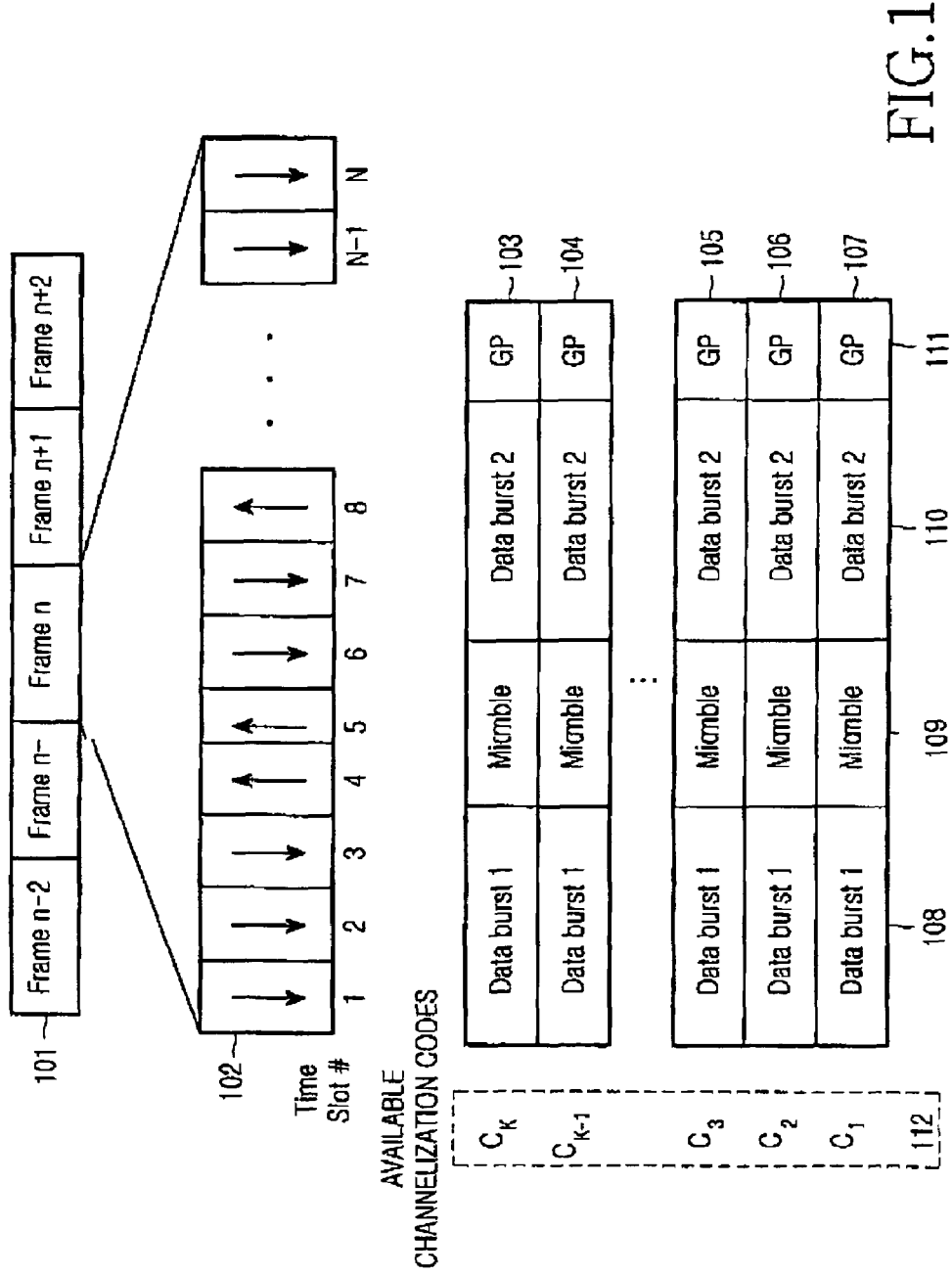
FIG. 1 illustrates a physical channel structure in a TD-CDMA mobile communication system according to a preferred embodiment of the present invention.

FIG. 1 illustrates a frame structure in a TD-CDMA mobile communication system according to the present invention. Referring to FIG. 1, each frame 101 comprises N time slots 102. The time slots 102 are separated into uplink time slots as indicated by upward arrows and downlink time slots as indicated by downward arrows. The downlink and uplink time slots may be selected freely or with some limit. In general, the numbers of the downlink and uplink time slots are determined according to the amounts of downlink and uplink data.

Each of the time slots 102 includes up to K code channels 103 to 107, which are identified by their respective channelization codes 112. Each code channel has two data bursts 108 and 110 and a midamble 109 between them. An uncoded midamble signal is transmitted in the midamble 109. Using the midamble 109, a receiver can determine the characteristics of a radio channel and a transmitter can transmit additional information, if necessary. A guard period (GP) 111 is inserted at the end of each time slot 102 to avoid inter-slot interference or interference between the downlink and the uplink.

In UTRA (UMTS Terrestrial Radio Access) HCR-TDD and LCR-TDD systems of 3GPP, downlink midamble assignment can be considered in three ways.

(1) UE-Specific Midamble Allocation

A different midamble is assigned to each UE. The UE-specific midamble allocation is applied when a plurality of UEs shares a physical channel in one downlink time slot and the physical channel uses beam forming without closed loop transmit diversity. Also, this scheme is used when physical layer signaling of a physical downlink shared channel (PDSCH) is performed by a midamble.

One or more downlink shared channels (DSCHs) are simultaneously mapped to the PDSCH. To notify a UE that the PDSCH has information destined for the UE, a Node B uses a midamble that is specific to the UE. In the time slot that delivers the PDSCH signaling information, there are no other code channels except DSCH signaling information for the UE. Therefore, there is no need for gaining knowledge of active channelization codes.

As for beam forming, because all UEs receive the physical channel by beam forming, ideally, they are spatially separated and there is no MAI from other code channels in the same time slot. Therefore, it is not necessary to consider the active channelization codes of other UEs in joint detection. Yet, in practice, beam forming that perfectly separates all UEs spatially entails high implementation complexity in smart antenna technology. When two or more UEs exist in the same radio space, MAI-caused performance degradation still exists with the beam forming. Along with the beam forming, therefore, joint detection using information about active channelization codes assigned to other UEs is effective in improving performance.

(2) Common Midamble Allocation

A common midamble is assigned to all UEs. When one UE occupies all physical channels in one downlink time slot, or a plurality of UEs share all physical channels in one downlink time slot with neither beam forming nor closed loop transmit diversity nor PDSCH signaling by a midamble, the common midamble allocation is used. The number of active channelization codes in the time slot is notified using the midamble.

(3) Default Midamble Allocation

A midamble is assigned in a one-to-one correspondence with an assigned channelization code. A UE performs joint channel estimation using midambles in a received signal to thereby detect midambles assigned to UEs and acquire knowledge of active channelization codes from the detected midambles. In this case, the active channelization code information is obtained from the midambles. It is regulated, however, that the default midamble allocation is not viable when one UE occupies one entire time slot.

Figure 2:
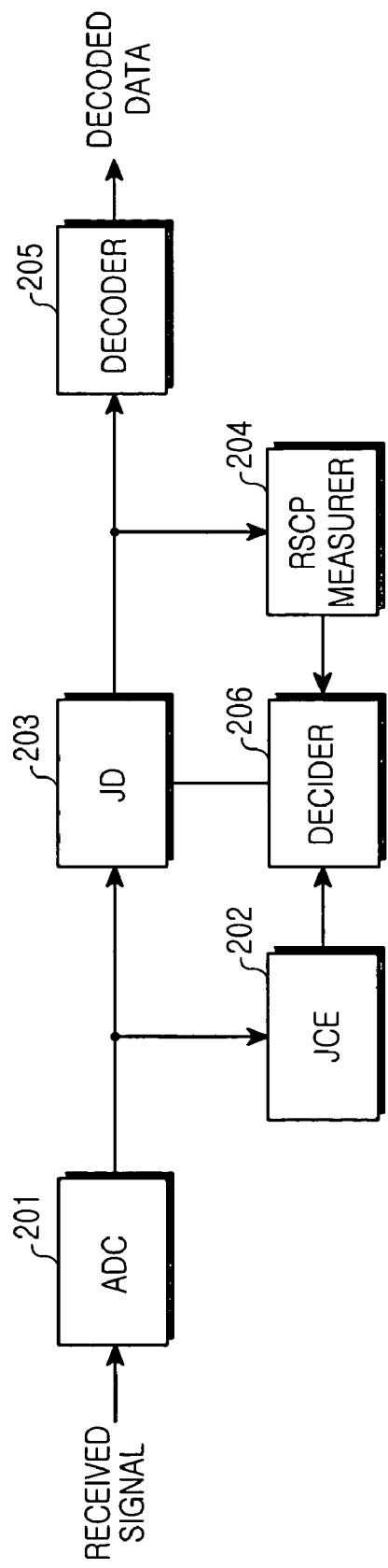
FIG. 2 is a block diagram of a receiver in a UE in the TD-CDMA mobile communication system according to a preferred embodiment of the present invention.

FIG. 2 is a block diagram of a baseband receiver in a UE in the TD-CDMA system. Referring to FIG. 2, an analog-to-digital converter (ADC) 201 converts an analog signal received from a Node B to a digital signal. A joint channel estimator (JCE) 202 channel estimates with respect to all available midambles using a midamble signal included in the digital signal, thereby obtaining channel estimation information and detecting midambles included in the received signal.

A joint detector (JD) 203 receives and demodulates a plurality of code channels in current use at the same time by channel estimation information and channel code information corresponding to the midambles, thereby detecting code channel data corresponding to assigned channel codes. The JCE 203 knows a midamble allocation scheme applied to the current time slot by higher-layer signaling. A very complex block in implementing the UE receiver is the JD 203. The complexity of the JD 203 increases exponentially according to the number of code channels received at the same time. Therefore, the UE receiver is configured with a limit on the number of code channels that the JD 203 can receive at a time. The number of code channels is less than a maximum number of code channels available in one time slot.

A received signal code power (RSCP) measurer 204 measures the RSCPs of the respective code channel data received from the JD 203. The RSCPs are used for higher-layer signaling and power control. A decider 206 determines, if an RSCP exceeds a predetermined threshold, that a channel code corresponding to the RSCP is in use. A channel decoder 205 corrects errors in and decodes code channel data of a channel code (channel codes) assigned to the UE.

The decider 206 determines channelization codes for joint detection in the JD 203 among all available channelization codes. According to the output of the RSCP measurer 204, it sets different channelization codes for the JD 203 and controls the JD 203 to output code channel data according to active channelization codes. According to a preferred embodiment of the present invention, the following channelization codes groups are set for joint detection in the JD 203:

(i) all active channelization codes including channelization codes assigned to the UE;
(ii) hypothesis channelization codes;
(iii) known active channelization codes including the assigned channelization codes, and hypothesis channelization codes; and
(iv) the assigned channelization codes and the hypothesis channelization codes.

The hypothesis channelization codes are channelization codes to be searched other than the determined as non-active channelization codes or active channelization codes including the assigned channelization codes. A channelization code, once it is determined as a non-active channelization code or an active channelization code, is excluded from the hypothesis channelization codes.

Group (i) is set when data corresponding to the channelization codes assigned to the UE are to be detected considering the influence of the active channelization codes as all active channelization codes are completely searched for. Groups (ii), (iii) and (iv) are used for detecting the active channelization codes.

By setting group (ii), all hypothesis channelization codes are searched by a minimum number of joint detections. Despite the advantage of the possibility of detecting all active channelization codes in one processing time (frame or time slot), group (ii) requires the most computation volume per unit time.

By setting group (iii), joint detection is performed on the active channelization codes including the channelization codes assigned to the UE, which are determined stepwise in a search operation, and the hypothesis channelization codes. The active channelization codes are detected by one or repeated joint detection of a received frame. Active channelization codes, which are not detected from one received frame, are detected from a following received frame. Group (iii) provides a more accurate detection result because the known active channelization codes are considered, but lengthens processing time when a plurality of received frames are used.

Group (iv) falls between group (iii) and group (ii) in terms of search time. For joint detection, the channelization codes assigned to the UE and the hypothesis channelization codes are set. If group (iv) is selected, the active channelization codes are detected and then data for the UE is detected by setting group (i). Group (iv) achieves a less accurate detection result than group (ii). Like group (iii), joint detection is performed once or repeatedly on one received frame to detect the active channelization codes. When searching for the active channelization codes over a plurality of process times (frames or time slots), group (iv) offers a low detection performance but improved detection accuracy. However, when searching for the active channelization codes in one process time, group (iv) offers decreased detection accuracy but increased detection performance.

In the UE-specific midamble allocation for PDSCH signaling or in the default midamble allocation, a UE acquires active channelization code information by joint channel estimation. The present invention is applicable when the UE cannot acquire the active channelization code information by joint channel estimation. In this case, the UE utilizes the multi-channel reception function of the JD 203, which will be described below in more detail.

Figure 3:
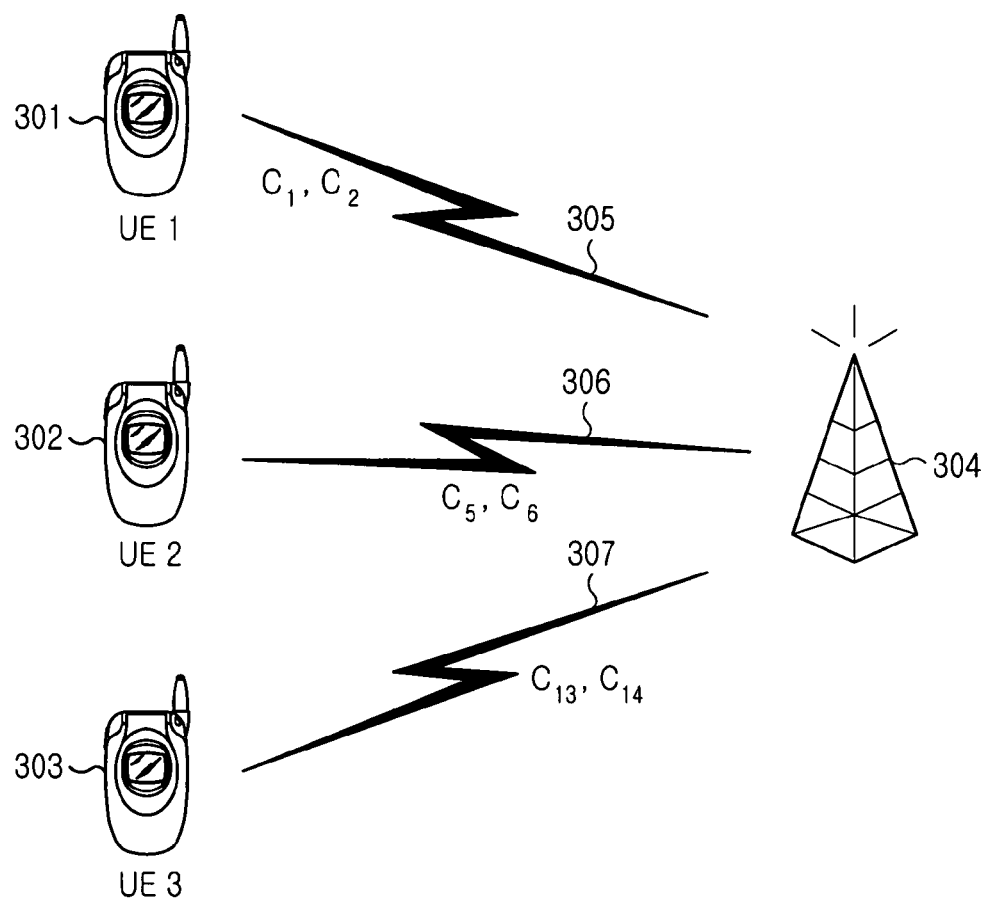
FIG. 3 illustrates assignment of channelization codes according to a preferred embodiment of the present invention.

FIG. 3 illustrates an example of a radio environment for describing a preferred embodiment of the present invention. Referring to FIG. 3, three UEs 301, 302, and 303 (or UE1, UE2, and UE3) share the same time slot in a cell 304. A pair of channelization codes 305, 306, or 307 is assigned to each of UE1, UE2, and UE3. UE1, UE2, and UE3 are currently using the assigned channelization codes. UE1, UE2, and UE3 each have a JD capable of receiving up to 6 code channels at the same time. Also, a common midamble allocation is used.

As described above, according to the common midamble allocation, the Node B 304 notifies UE1, UE2, and UE3 of the number of the channelization codes used in the current time slot. Therefore, each UE performs a search algorithm to acquire active channelization codes based on the information.

Figure 4:
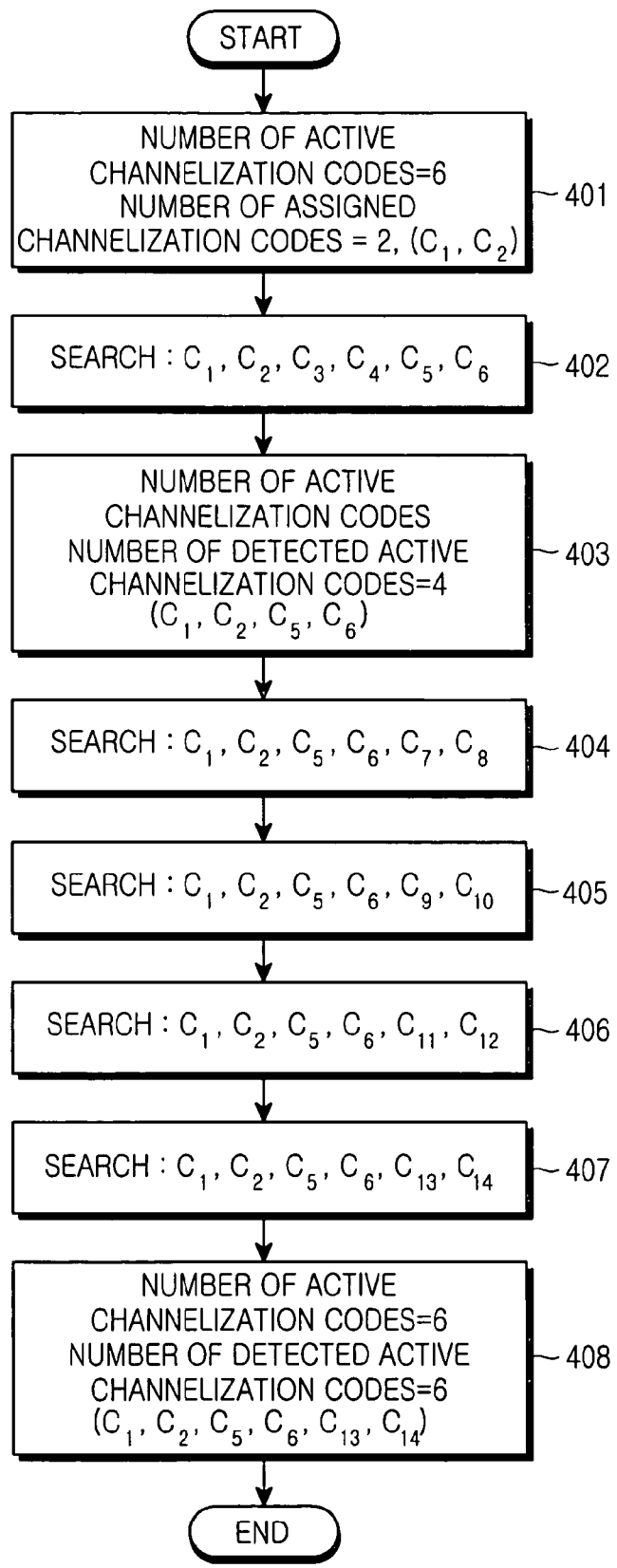
FIG. 4 is a flowchart illustrating an operation for detecting active channelization codes in the channelization code assignment illustrated in FIG. 3 according to a preferred embodiment of the present invention.

FIG. 4 is a flowchart illustrating an operation in a UE for receiving its assigned code channel through a JD and detecting active channelization codes in use for other UEs in the situation illustrated in FIG. 3. UE1, UE2, and UE3 operate in the same manner. Therefore, only the operation of UE1 is focused on in the following description by way of example. For joint detection, group (iii) is set.

Referring to FIG. 4, UE1 receives from the Node B 304, information related to the number and indexes of channelization codes assigned to UE1 and the number of active channelization codes in the current time slot in step 401. The channel codes assigned to UE1 are $C_1, C_2$ and the remaining channel codes among a total of K available channelization codes, i.e., other than $C_1, C_2$, are hypothesis channelization codes. In step 402, UE1 performs joint detection on a set of the assigned channelization codes $C_1, C_2$ and four freely selected hypothesis channelization codes $C_3, C_4, C_5, C_6$ using a JD capable of demodulating six code channels at the same time. UE1 measures the RSCPs of code channel signals detected using the channelization code set and determines whether the RSCPs exceed a predetermined threshold. UE1 selects two channelization codes $C_5, C_6$ having RSCPs greater than the threshold as active channelization codes in step 403. The remaining channelization codes other than the assigned channelization codes $C_1, C_2$ and the selected active channelization codes $C_5, C_6$ are newly designated as hypothesis channelization codes.

In step 404, UE1 performs joint detection on a set of the known active channelization codes $C_1, C_2, C_5, C_6$ and two freely selected hypothesis channelization codes $C_7, C_8$. The RSCPs of the channelization codes $C_7, C_8$ do not exceed the threshold. Then, UE1 performs joint detection on a set of the known active channelization codes $C_1, C_2, C_5, C_6$ and two other hypothesis channelization codes $C_9, C_{10}$ in step 405. The RSCPs of $C_9, C_{10}$ do not exceed the threshold either. Again, UE1 performs joint detection on a set of the known active channelization codes $C_1, C_2, C_5, C_6$ and two other hypothesis channelization codes $C_{11}, C_{12}$ in step 406. Again, the RSCPs of $C_{11}, C_{12}$ do not exceed the threshold either.

In step 407, UE1 performs joint detection on a set of the known active channelization codes $C_1, C_2, C_5, C_6$ and two other hypothesis channelization codes $C_{13}, C_{14}$. The RSCPs of $C_{13}, C_{14}$ exceed the threshold because UE2 and UE3 are using them. UE1 then identifies $C_{13}, C_{14}$ as active channelization codes in addition to $C_1, C_2, C_5, C_6$ in step 408.

As illustrated in FIG. 4, the UE repeats the search operation including joint detection and RSCP measuring until it detects as many active channelization codes as a predetermined number. Alternatively, the UE may perform joint detection only on hypothesis channelization codes other than known active channelization codes.

Herein below, the present invention will be described in a more generalized manner.

If the number of channelization codes assigned to a UE is K(u) and the number of active channelization codes known through joint detection in an $n^{th}$ search step is K(n), K(n) is larger than K(u). In an initial state, K(0)=K(u). The UE can receive K(jd) code channels at the same time, and up to K(max) channelization codes are available in one time slot. Additionally, a common midamble allocation scheme is used.

Due to the common midamble allocation, the UE knows the number of active channelization codes including its assigned channelization codes by joint channel estimation. If the number of active channelization codes known by the joint channel estimation is K(jce), K(u)=K(jce)=K(max). Assuming that the UE detects K(fin) active channelization codes at one time, K(fin) is assigned a value that is the smaller of K(jd) or K(jce). Even if K(jce) active channelization codes are used, when the demodulation capacity of a JD in the UE is limited to K(jd) channelization codes, more than K(jd) channelization codes cannot be subject to joint detection.

In an initial search step, the UE attempts to acquire K(fin)-K(u) active channelization codes because it already knows K(u) channelization codes. When K(n) active channelization codes are acquired in an $n^{th}$ search step, the UE attempts to acquire K(fin)-K(n) active channelization codes in an $(n+1)^{th}$ search step. The search operation lasts until K(fin) is equal to K(n).

In the above-described embodiment, the UE acquires K(jce) active channelization codes according to the common midamble allocation scheme. When K(jce) is not known due to use of the UE-specific midamble allocation scheme or for any other reason, a different embodiment is performed as described below.

The number of hypothesis channelization codes that the UE needs to search at an initial state is S(0:hyp). Here, S(0:hyp)=K(max)-K(0)=K(max)-K(u). If S(n-1) channelization codes have been searched in an $(n-1)^{th}$ search step, the number S(n:hyp) of hypothesis channelization codes to search in an $n^{th}$ search step is S(n-1:hyp)-S(n-1). S(n-1:hyp) is the number of hypothesis channelization codes in the $(n-1)^{th}$ search step. The search operation is repeated until the number of the hypothesis channelization codes is 0, which implies that there are no more channelization codes to search. The number of hypothesis channelization codes is also computed in the same manner when K(jce) is known by joint channel estimation.

Figure 5:
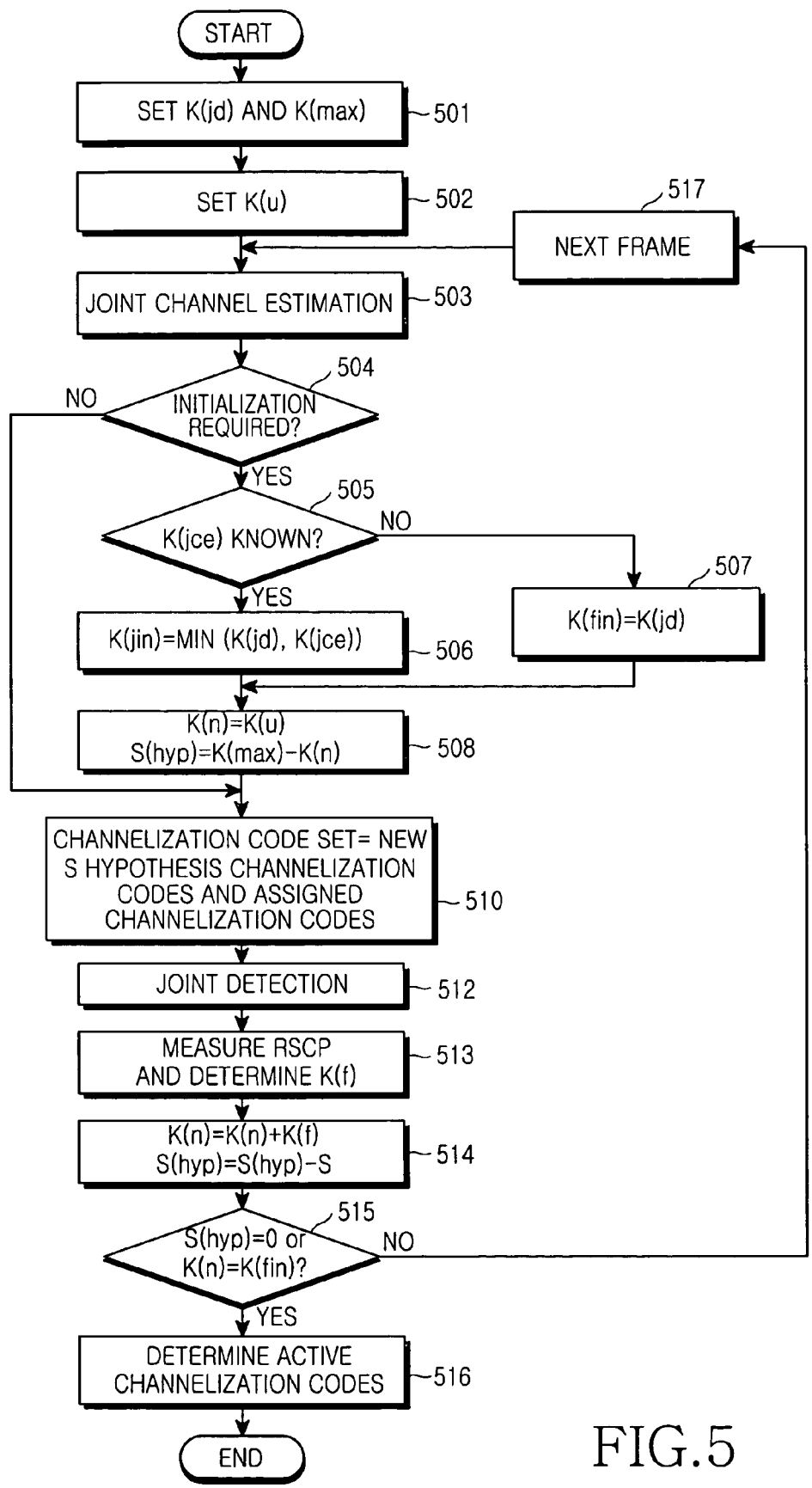
FIG. 5 is a flowchart illustrating a generalized operation for determining active channelization codes according to a preferred embodiment of the present invention.

FIG. 5 is a flowchart illustrating a generalized operation for detecting active channelization codes according to a preferred embodiment of the present invention. All steps except steps 512 and 513 are preferably performed in the decider 206, which is illustrated in FIG. 2. Preferably, steps 512 and 513 occur in the JD 203 and the RSCP measurer 204, respectively. However, for notational simplicity, it will be described broadly that the steps are carried out by a UE.

Referring to FIG. 5, the UE sets the number of channelization codes that can be subject to joint detection K(jd) and the maximum number of available channelization codes K(max) in step 501. K(jd) depends on the structure of a JD, while K(max) depends on network configuration. In step 502, the UE is notified of its assigned channelization codes and the number of the assigned channelization codes when a call is set up or updated K(u).

The UE obtains channel estimation information and detects midambles included in a received signal in a time slot of a frame through joint channel estimation of the received signal in step 503. In step 504, the UE determines whether initialization is required. If initialization is required, steps 505 to 508 are performed. However, initialization is not required, the UE jumps to step 510.

Initialization is required when (1) the active channelization code detection algorithm is initially performed; (2) the number of active channelization codes computed by joint channel estimation is changed; (3) information about the assigned channelization codes is changed; or (4) the RSCPs of known active channelization codes drop to or below a predetermined threshold after joint detection.

Initialization is performed in steps 505 through 508. In step 505, the UE determines whether K(jce) for the current time slot is known. As described before, the UE knows K(jce) in the common midamble allocation scheme but does not in the UE-specific midamble allocation scheme or any other scheme. In the former case, the UE proceeds to step 506, and in the latter case, the UE goes to step 507.

The UE sets the number of active channelization codes to detect K(fin) in step 506. K(fin) is set to the smaller value between K(jd) and K(jce). If K(jce) is not known, the UE sets K(fin) to equal K(jd) in step 507. In step 508, the UE sets the number of active channelization codes that it already knows K(n) to equal K(u) and the number of hypothesis channelization cods to search S(hyp) to equal K(max)-K(u). The hypothesis channelization codes are the remaining channelization codes other than the K(u) channelization codes assigned to the UE among the K(max) available channelization codes.

After step 504 or 508, the UE sets S random hypothesis channelization codes and the K(u) assigned channelization codes as a channelization code set for joint detection in step 510. The parameter S is equal to or less than (K(jd)-K(u)). In step 512, the UE detects code channel data corresponding to the channelization code set by performing joint detection on the channelization code set. The UE measures the RSCPs of the code channel data and compares them with a predetermined threshold in step 513. The UE selects the channelization codes having RSCPs exceeding the threshold as active channelization codes and stores the number of the new detected active channelization codes other than the K(u) assigned channelization codes as a parameter K(f) in step 513.

In step 514, the UE adds K(f) to K(n) and subtracts the number of hypothesis channelization codes used in the search operation S from S(hyp). The remaining hypothesis channelization codes, except the S channelization codes, are newly designated as hypothesis channelization codes.

In step 515, the UE determines whether S(hyp) is 0 or K(n)=K(fin). If either of the conditions is satisfied, the UE proceeds to step 516, considering that all available active channelization codes have been detected. In step 516, the UE finally determines the active channelization codes including the assigned ones and terminates the active channelization code detection algorithm.

However, if neither of the conditions is satisfied, the UE receives the next frame in step 517 and returns to step 503. After the active channelization codes are determined, the UE performs joint detection on them, thereby eliminating ISI and MAI caused by the channelization codes of other UEs from the code channel data corresponding to the assigned channelization codes.

It can be further contemplated as another embodiment that the channelization code set for joint detection is formed to include all detected active channelization codes and hypothesis channelization codes from group (iii), or only the hypothesis channelization codes in group (ii), instead of group (iv). In the case of setting group (iii), the UE does not perform joint detection on the detected active channelization codes because joint detection and RSCP results obtained in the final search step virtually involve all active channelization codes.

In the case of setting group (ii), the UE does not use the next frame in detecting the remaining active channelization codes. That is, if the condition of step 515 is not satisfied, the UE returns to step 510, not proceeding to step 517, because all hypothesis channelization codes can be searched rapidly and thus the detection algorithm can be completed within one frame duration.

In accordance with the present invention as described above, a UE detects active channelization codes on its own, as compared to a conventional detection scheme in which a Node B transmits active channelization code information to a UE. Therefore, there is no need for additional signaling for joint detection. Also, because the present invention is implemented using existing hardware, the volume (or size) of the UE does not increase.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of detecting in a user equipment (UE) active channelization codes including channelization codes used by other UEs, which are different from at least one channelization code assigned to the UE, for communicating with a Node B in an assigned time slot, in a Time Division-Code Division Multiple Access (TD-CDMA) system in which each time slot of a radio channel frame is identified by a plurality of code channels, each having a unique channelization code, the method comprising the steps of:

(1) forming a channelization code set including a predetermined number of active channelization codes and the set including a number of assigned channelization codes and a number of hypothesis channelization codes to be searched;

(2) detecting code channel data using a joint detection corresponding to the channelization codes in the channelization code set from a received signal and measuring code power values of the code channel data corresponding to the channelization codes;

(3) comparing the code power values with a predetermined threshold and selecting channelization codes having code power values greater than the predetermined threshold as the active channelization codes;

(4) updating the number of active channelization codes and the number of hypothesis channelization codes depending on a detection result and a comparison result; and repeating step (1) to step (4) until as many active channelization codes are detected as the predetermined number of active channelization codes.

2. The method of claim 1, wherein the hypothesis channelization codes are remaining channelization codes, not including the at least one channelization code assigned to the UE, among all available channelization codes for the assigned time slot and the channelization code set includes at least one of the hypothesis channelization codes.

3. The method of claim 2, wherein the channelization code set includes at least one of the hypothesis channelization codes.

4. The method of claim 2, wherein the channelization code set includes the at least one channelization code assigned to the UE and at least one of the hypothesis channelization codes.

5. The method of claim 2, wherein the channelization code set includes known active channelization codes, including the at least one channelization code assigned to the UE, and at least one of the hypothesis channelization codes.

6. The method of claim 2, wherein the channelization code set includes as many channelization codes as a smaller number between a number of code channels that can be simultaneously joint-detected and a number of active channelization codes that the Node B notifies the UE of.

7. The method of claim 1, further comprising the steps of:
   updating the channelization code set to not include the detected active channelization codes and returning to step (2), if a desired number of active channelization codes including the at least one channelization code assigned to the UE are not detected completely; and
   outputting the code channel data and the code power values of the detected active channelization codes, if the desired number of active channelization codes is detected completely.

8. The method of claim 1, further comprising the steps of:
   updating the channelization code set to not include the detected active channelization codes and returning to step (2), if there are still channelization codes to be searched; and
   outputting the code channel data and the code power values of the detected active channelization codes, if there are no remaining channelization codes to be searched.

9. A user equipment (UE) for detecting active channelization codes including channelization codes used by other UEs, which are different from at least one channelization code assigned to the UE, for communicating with a Node B in an assigned time slot in a Time Division-Code Division Multiple Access (TD-CDMA) system in which each time slot of a radio channel frame is identified by a plurality of code channels, each having a unique channelization code, the UE comprising:

a joint detector for detecting code channel data from a received signal corresponding to a formed channelization code set including a predetermined number of channelization codes and the set including a number of assigned channelization codes and a number of hypothesis channelization codes;

a measurer for measuring code power values of the code channel data corresponding to the predetermined number of channelization codes; and a decider for applying the channelization code set to the joint detector, comparing the code power values with a predetermined threshold, and selecting channelization codes having code power values greater than the predetermined threshold as the active channelization codes, wherein the UE is adapted for updating the number of active channelization codes and the number of hypothesis channelization codes depending on a detection result and a comparison result; and wherein the UE is further adapted for repeating joint detection, measurement of code power values, and comparison and update of the numbers until as many active channelization codes are detected as the predetermined number of active channelization codes.

10. The UE of claim 9, wherein the decider designates remaining channelization codes, not including the at least one channelization code assigned to the UE, among all available channelization codes for the assigned time slot as hypothesis channelization codes and decides the channelization code set to include at least one of the hypothesis channelization codes.

11. The UE of claim 10, wherein the channelization code set includes at least one of the hypothesis channelization codes.

12. The UE of claim 10, wherein the channelization code set includes the at least one channelization code assigned to the UE and at least one of the hypothesis channelization codes.

13. The UE of claim 10, wherein the channelization code set includes known active channelization codes, including the at least one channelization code assigned to the UE, and at least one of the hypothesis channelization codes.

14. The UE of claim 10, wherein the channelization code set includes as many channelization codes as a smaller number selected from either a number of code channels that can be simultaneously joint-detected and a number of active channelization codes that the Node B notifies the UE of.

15. The UE of claim 9, wherein if a desired number of active channelization codes, including the at least one channelization code assigned to the UE, are not detected completely, the decider updates the channelization code set to not include the detected active channelization codes and applies the updated channelization code set to the joint detector, and if the desired number of active channelization codes are detected completely, the decider controls the joint detector to output the code channel data and the code power values of the detected active channelization codes.

16. The UE of claim 9, wherein if there are remaining channelization codes to be searched, the decider updates the channelization code set to not include the detected active channelization codes and applies the updated channelization code set to the joint detector, and if there are no remaining channelization codes to be searched, the decider controls the joint detector to output the code channel data and the code power values of the detected active channelization codes.

* * * * *